(12) United States Patent
Carlsson

(10) Patent No.: US 7,213,480 B2
(45) Date of Patent: May 8, 2007

(54) MOTOR VEHICLE TRANSMISSION

(75) Inventor: Sven-Ake Carlsson, Eskilstuna (SE)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 127 days.

(21) Appl. No.: 11/162,005

(22) Filed: Aug. 25, 2005

(65) Prior Publication Data

US 2005/0284243 A1    Dec. 29, 2005

Related U.S. Application Data

(63) Continuation of application No. PCT/SE2004/000154, filed on Feb. 6, 2004.

(30) Foreign Application Priority Data

Feb. 25, 2003  (SE) .................................. 0300497

(51) Int. Cl.
  *F16H 3/08*  (2006.01)
  *F16H 3/38*  (2006.01)
(52) U.S. Cl. .......................................... 74/331; 74/340
(58) Field of Classification Search .................. 74/325, 74/329, 331, 335, 340, 404
  See application file for complete search history.

(56) References Cited

U.S. PATENT DOCUMENTS

| 5,125,282 | A  |   | 6/1992  | Bender et al. |
| 5,181,431 | A  |   | 1/1993  | Zaiser et al. |
| 5,353,661 | A  | * | 10/1994 | Ordo ............................ 74/331 |
| 5,390,562 | A  | * | 2/1995  | Sherman ....................... 74/335 |
| 5,513,542 | A  | * | 5/1996  | Bogema et al. ............... 74/331 |
| 6,427,549 | B1 | * | 8/2002  | Bowen ......................... 74/331 |

FOREIGN PATENT DOCUMENTS

EP    0040864 A2    12/1981

OTHER PUBLICATIONS

International Search Report from corresponding International Application No. PCT/SE2004/000154.

* cited by examiner

*Primary Examiner*—Roger Pang
(74) *Attorney, Agent, or Firm*—WRB-IP LLP

(57) ABSTRACT

A motor vehicle transmission having two intermediate shafts, which can alternately be driven via disengageable primary gearwheels, and drive a main shaft, via gearwheels on the respective main shaft and intermediate shaft, which gearwheels engage with one another in pairs. Mounted on an input shaft are two lockable and disconnectable drive gearwheels, one of which directly drives the primary gearwheels in a first rotational direction, whilst the other of which, via an intermediate gearwheel, drives the primary gearwheels in an opposite direction. The realization produces a transmission having an equal number of forward and reverse gears, which can be shifted without interruption of torque.

19 Claims, 1 Drawing Sheet

MOTOR VEHICLE TRANSMISSION

DESCRIPTION

The present application is a continuation of International Application PCT/SE2004/000154 filed Feb. 6, 2004, which claims priority to Swedish Application No. 0300497-5, filed Feb. 25, 2003, both of which are hereby incorporated by reference.

The present invention relates to a motor vehicle transmission, comprising an input shaft intended for drivable coupling to a motor, a first intermediate shaft having a first primary gearwheel mounted rotatably on the shaft, a second intermediate shaft having a second primary gearwheel mounted rotatably on the shaft, first and second clutch members coordinated with the first and second primary gearwheel respectively and enabling the primary gearwheels to be locked alternately onto an associated shaft so as to transmit torque from the input shaft to the respective intermediate shaft, a main shaft, and gearwheels supported by the intermediate shafts and the main shaft, which gearwheels engage with one another in pairs so as to transmit torque from one or other intermediate shaft to the main shaft and whereof at least one gearwheel in each pair is a disengageable running wheel.

Dual intermediate shafts are used, on the one hand, in transmissions in which, for a given transmission length, there is a wish to obtain more gears than is practically possible in a conventional transmission construction having a single intermediate shaft and, on the other hand, in so-called "powershift" transmissions, i.e. transmissions having dual input shafts, which are driven by their respective clutch and drive their respective intermediate shaft. In such transmissions the gear positions are preselected, according to which the actual gearshift is effected by the disengagement of one clutch and engagement of the other clutch. The gearshift can here be performed, without interruption of torque, by the gradual engagement of one clutch simultaneous with the gradual disengagement of the other clutch. In a six-speed transmission, for example, the first, third and fifth gears can be obtained through one input shaft and one intermediate shaft, whilst the second, fourth and sixth gears are obtained through the other input shaft and the other intermediate shaft.

In order to obtain one or more reverse gears, two fundamentally different solutions are known. In one solution, an intermediate gearwheel on a separate reverse shaft is used to transmit torque from one intermediate shaft to the main shaft/output shaft so as to reverse the rotational direction of the shaft. In the other solution, torque is transmitted from one intermediate shaft to the other intermediate shaft and from there to the main shaft. In this case, therefore, the said other intermediate shaft is used as the reverse shaft, thereby eliminating the need for a separate reverse shaft. Examples of the latter solution are illustrated and described in SE-A-506 223. This transmission is a "powershift" transmission having dual concentric input shafts driven by the respective output shaft of a motor-driven clutch. Even forward gear steps are engaged through the one clutch and odd forward gear steps through the other clutch. Powershift transmissions of the type described above are used, for example, in heavy trucks.

It is desirable to produce a transmission of the type stated in the introduction, which is especially suitable for use in working machines, such as, for example, dumpers and loaders, which require just as many reverse gears as forward gears, often change the direction of travel between forward and reverse and in which the torque requirement is often altered directly after reversal of the direction of travel.

According to an aspect of the invention, a first drive gearwheel, upon engagement of a first clutch device, is arranged to transmit torque from the input shaft to both the primary gearwheels simultaneously for driving of the primary gearwheels in a first direction, and a second drive gearwheel, upon disengagement of the first clutch device and engagement of a second clutch device, is arranged to transmit torque from the input shaft to both the primary gearwheels simultaneously for driving of the primary gearwheels in a direction opposite to the said first direction.

By, according to an aspect of the invention, coordinating the clutches for the alternate driving of the intermediate shafts directly with the respective intermediate shaft and coordinating a clutch for reversal of the rotation of the intermediate shafts with the input shaft, a transmission can be produced having just as many reverse gears as forward gears, in which the gearshift between different reverse gears, like the gearshift between forward and reverse, can be executed without interruption of torque. The realization according to an aspect of the invention makes it possible, by means of a single intermediate gear between a gearwheel on the input shaft and one primary gearwheel, easily to achieve a gear differential between the various forward and reverse gears, so that, for example, higher torque and lower speed are obtained in a certain forward gear than in a corresponding reverse gear, which is especially advantageous as regards loaders, which are often driven faster backwards following acceptance of a load.

BRIEF DESCRIPTION OF THE DRAWINGS

The invention is described in greater detail with reference to illustrative embodiments shown in the appended drawings, in which.

DETAILED DESCRIPTION

Figure 1:
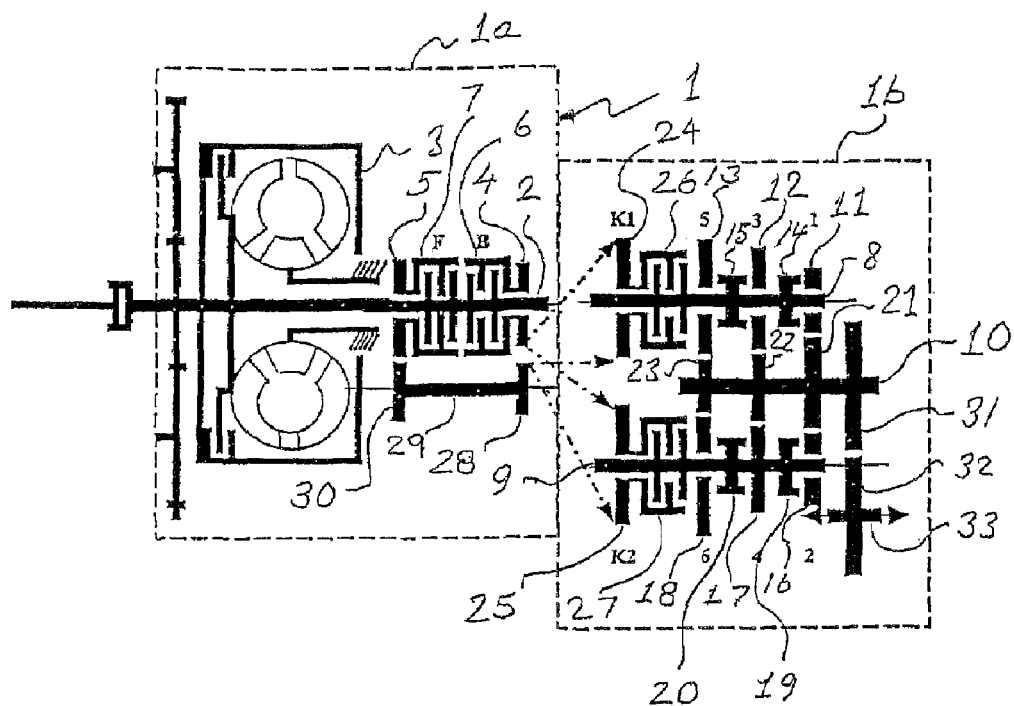
FIG. 1 shows a diagrammatic representation of an embodiment of a transmission according to the invention especially intended for a loader.

The transmission shown in FIG. 1 has a casing 1, containing a rotatably mounted input shaft 2, which, in a manner which is known per se, is coupled in a drivable manner to a conventional torque converter 3.

Mounted rotatably on the input shaft 2 are a first drive gearwheel 4 and a second drive gearwheel 5, which can be locked onto and disconnected from the shaft 1 by means of first and second friction clutches 6 and 7 respectively, preferably wet-plate multi-disk clutches.

Also mounted rotatably in the casing 1 are a first intermediate shaft 8, a second intermediate shaft 9 and a main shaft 10.

Mounted rotatably on the first intermediate shaft 8 are three running gearwheels 11, 12 and 13. The gearwheel 11 can be locked onto and disconnected from its shaft 8 by means of a clutch sleeve 14 mounted displaceably but non-rotatably on the shaft and having synchronizing devices (not shown) which are known per se. The gearwheels 12 and 13 can be locked onto and disconnected from the shaft 8 by means of a clutch sleeve 15 having corresponding synchronizing devices (not shown).

Mounted rotatably on the second intermediate shaft 9 are three running gearwheels 16, 17 and 18. The gearwheel 16 can be locked onto and disconnected from its shaft 9 by means of a clutch sleeve 19 mounted displaceably but non-rotatably on the shaft and having synchronizing devices (not shown) which are known per se. The gearwheels 17 and 18 can be locked onto and disconnected from the shaft 9 by means of a clutch sleeve 20 having corresponding synchronizing devices (not shown).

Also mounted rotatably on the respective intermediate shaft 8 and 9 are primary gearwheels 24 and 25, which, by means of their respective multi-disk plate clutch 26 and 27, are lockable on their respective shaft. The primary gearwheels 24 and 25 engage, on the one hand, directly with the drive gearwheel 4 and, on the other hand, with an intermediate gearwheel 28, which is disposed in a rotationally secure manner on a third intermediate shaft 29 mounted rotatably in the casing 1, which intermediate shaft also has a further gearwheel 30, which is disposed in a rotationally secure manner on the shaft 29 and engages with the drive gearwheel 5. The engagement between the drive gearwheels 4 and 5 and the primary gearwheels 24 and 25, respectively, is illustrated by arrows in the figures.

Upon the engagement of the clutch 6, the input shaft 2, via the drive gearwheel 4, directly drives the two primary gearwheels 24 and 25 in a first rotational direction and with a first gear ratio between the input shaft 2 and the primary gearwheels 24 and 25. Upon disengagement of the clutch 6 and engagement of the clutch 7, the input shaft 2 drives, via the gearwheel 30, the third intermediate shaft 29 and, [via] the intermediate gearwheel 28, the two primary gearwheels 24 and 25 in a direction opposite to the first rotational direction and with a second gear ratio higher than the first gear ratio, since, as is evident from the figures, the intermediate gearwheel 28 is smaller than the drive gearwheel 4.

The gearwheels 11, 12 and 13 on the intermediate shaft 8 and the gearwheels 16, 17 and 18 on the intermediate shaft 9 engage in the said order with gearwheels 21, 22 and 23 disposed in a rotationally secure manner on the main shaft 10. As a result of the described arrangement, a transmission is obtained which offers first, third and fifth gear via the intermediate shaft 8 and second, fourth and sixth gear via the intermediate shaft 9, as marked in FIG. 1.

Necessary speed difference between first and second, third and fourth and fifth and sixth gears for a given rotation speed of the input shaft 2 is obtained by the primary gearwheels 24 and 25 of the intermediate shafts 8 and 9 having different diameters, with the result that the intermediate shafts are driven at different rotation speeds. As regards the gear differential between the respective drive gearwheel 4 and 5 and the associated primary gearwheel 24 and 25, in loaders the higher gearing, which gives lower speed and higher drive force for a given rotation speed of the input shaft 2 than the lower gearing, is preferably used for the forward gears, and hence the lower gearing for the reverse gears, since loading normally gives rise to greater resistance to the motion of the loader than does mere driving with raised load. Consequently, the clutch 7 is engaged and the clutch 6 disengaged in forward travel and, conversely, the clutch 7 disengaged and the clutch 6 engaged in reversing.

The gearshift between forward and reverse can be realized without interruption of torque and using the torque converter 3, which is braked by gradual engagement of the clutch 6 before the clutch 7 is fully disengaged. When changing between the various gear steps during driving, it is the case both in reversing and in forward travel that the primary shaft clutch 26 or 27 of the, momentarily, driving primary gearwheel 24 or 25 is gradually disengaged, at the same time as the clutch 27 or 26 of the, momentarily, non-driving primary gearwheel 25 or 24 is gradually engaged, thereby achieving a soft gearshift without interruption of torque.

The transmission which is described above and illustrated in FIG. 1, especially intended for a loader, has on its main shaft 10 a rotationally secure gearwheel 31, which engages with a gearwheel 32 on an output shaft 33, in which output torques to front and rear driving wheels of the vehicle are marked by arrows.

Figure 2:
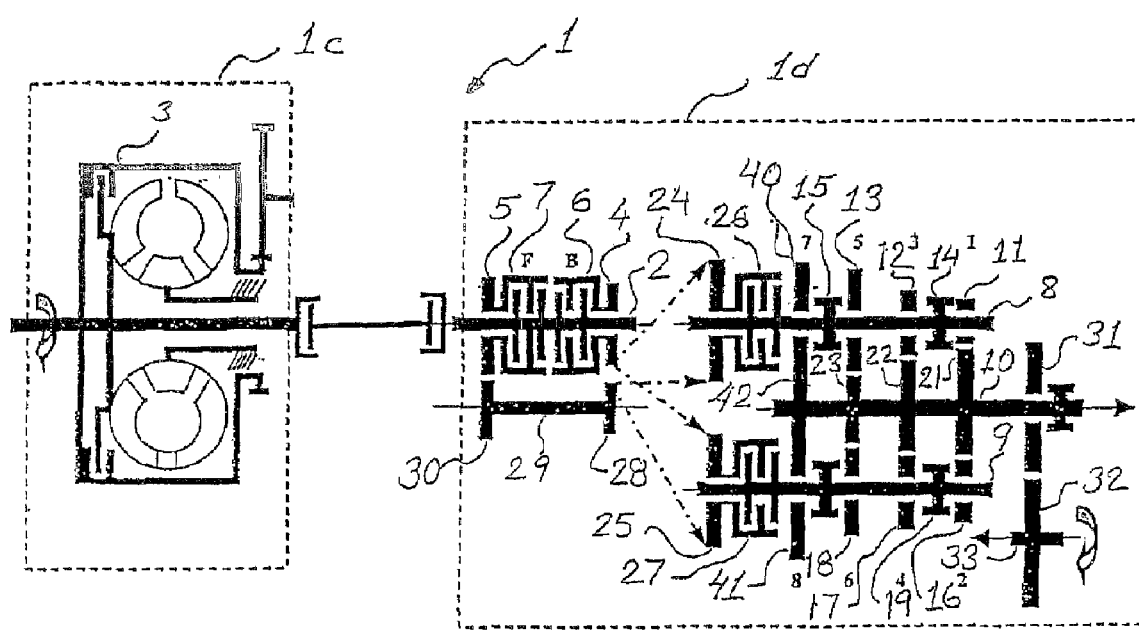
FIG. 2 shows a corresponding representation of an embodiment of a transmission especially intended for a dumper.

FIG. 2 shows an embodiment of a transmission according to the invention especially intended for a so-called dumper. Parts with correspondence in the realization in FIG. 1 have been given the same reference notations as in FIG. 1. The transmission in FIG. 2 differs from the one described above only in that it has two additional gear steps seven and eight, which are obtained by a further gearwheel 40, 41 and 42 on the respective intermediate shaft 8 and 9 and the main shaft 10, respectively. The clutches 14 and 19 are here twin clutches for the engagement of first, second, third and fourth gears. Here the main shaft 10 is also the output shaft to a driving pair of wheels of the vehicle.

The transmission casing 1 is indicated in the figures by dashed lines. As can be seen from FIG. 1, the casing is here divided into a module Ia, which encloses the torque converter 3 and the input shaft 2 with associated drive gearwheels 4, 5, clutches 26, 27, and intermediate shaft 29 with associated gearwheels 28 and 30. The embodiment in FIG. 2 has a separate module Ic solely for the torque converter 3, whilst all other components of the transmission are accommodated in a module Id.

The modular construction made possible by the realization described above offers simple adaptation to different installations and different power and torque requirements.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A motor vehicle transmission, comprising an input shaft intended for drivable coupling to a motor, a first intermediate shaft having a first primary gearwheel mounted rotatably on the shaft, a second intermediate shaft having a second primary gearwheel mounted rotatably on the shaft, first and second clutch members coordinated with the first and second primary gearwheel respectively and enabling the first and second primary gearwheels to be locked alternately onto a respective intermediate shaft so as to transmit torque from the input shaft to the respective intermediate shaft, a main shaft, and gearwheels supported by the intermediate shafts and the main shaft, which said gearwheels engage with one another in pairs so as to transmit torque from one or other intermediate shaft to the main shaft and whereof at least one gearwheel in each pair is a disengageable running wheel, wherein a first drive gearwheel, upon engagement of a first clutch device, is arranged to transmit torque from the input shaft to both the first and second primary gearwheels simultaneously for driving of the first and second primary gearwheels in a first direction, and a second drive gearwheel, upon disengagement of the first clutch device and engagement of a second clutch device, is arranged to transmit torque from the input shaft to both the first and second primary gearwheels simultaneously for driving of the first and second primary gearwheels in a direction opposite to the first direction.

2. The transmission as claimed in claim 1, wherein the first drive gearwheel is arranged, upon engagement of the first clutch device, to drive the intermediate shafts in the same rotational direction as the input shaft, and the second drive gearwheel is arranged, upon disengagement of the first clutch device and engagement of the second clutch device, via an intermediate gearwheel, to drive the intermediate shafts in a direction opposite to the rotational direction of the input shaft.

3. The transmission as claimed in claim 2, wherein the first and second drive gearwheels are mounted rotatably on the input shaft and can be locked onto and disconnected from the input shaft by means of the first and second clutch devices.

4. The transmission as claimed in claim 3, wherein the first drive gearwheel engages directly with the first and the second primary gearwheel, the second drive gearwheel engages with a gearwheel on a third intermediate shaft and the intermediate gearwheel is supported by the third intermediate shaft and engages directly with the first and second primary gearwheel.

5. The transmission as claimed in claim 1, wherein the input shaft is connected in a drivable manner to a torque converter.

6. The transmission as claimed in claim 1, wherein the running wheels can be locked onto and disconnected from their associated shaft by means of clutch sleeves mounted in non-rotatable but axially displaceable arrangement on the shaft and having synchronizing devices.

7. The transmission as claimed in claim 1, wherein the running wheels are mounted rotatably on the first and second intermediate shaft and opposing running wheels on the intermediate shafts engage with common gearwheels connected in a rotationally secure manner to the main shaft.

8. The transmission as claimed in claim 2, wherein the input shaft is connected in a drivable manner to a torque converter.

9. The transmission as claimed in claim 2, wherein the running wheels can be locked onto and disconnected from their associated shaft by means of clutch sleeves mounted in non-rotatable but axially displaceable arrangement on the shaft and having synchronizing devices.

10. The transmission as claimed in claim 2, wherein the running wheels are mounted rotatably on the first and second intermediate shaft and opposing running wheels on the intermediate shafts engage with common gearwheels connected in a rotationally secure manner to the main shaft.

11. The transmission as claimed in claim 3, wherein the input shaft is connected in a drivable manner to a torque converter.

12. The transmission as claimed in claim 3, wherein the running wheels can be locked onto and disconnected from their associated shaft by means of clutch sleeves mounted in non-rotatable but axially displaceable arrangement on the shaft and having synchronizing devices.

13. The transmission as claimed in claim 3, wherein the running wheels are mounted rotatably on the first and second intermediate shaft and opposing running wheels on the intermediate shafts engage with common gearwheels connected in a rotationally secure manner to the main shaft.

14. The transmission as claimed in claim 4, wherein the input shaft is connected in a drivable manner to a torque converter.

15. The transmission as claimed in claim 4, wherein the running wheels can be locked onto and disconnected from their associated shaft by means of clutch sleeves mounted in non-rotatable but axially displaceable arrangement on the shaft and having synchronizing devices.

16. The transmission as claimed in claim 4, wherein the running wheels are mounted rotatably on the first and second intermediate shaft and opposing running wheels on the intermediate shafts engage with common gearwheels connected in a rotationally secure manner to the main shaft.

17. The transmission as claimed in claim 5, wherein the running wheels can be locked onto and disconnected from their associated shaft by means of clutch sleeves mounted in non-rotatable but axially displaceable arrangement on the shaft and having synchronizing devices.

18. The transmission as claimed in claim 5, wherein the running wheels are mounted rotatably on the first and second intermediate shaft and opposing running wheels on the intermediate shafts engage with common gearwheels connected in a rotationally secure manner to the main shaft.

19. The transmission as claimed in claim 6, wherein the running wheels are mounted rotatably on the first and second intermediate shaft and opposing running wheels on the intermediate shafts engage with common gearwheels connected in a rotationally secure manner to the main shaft.

\* \* \* \* \*